United States Patent

Bolinger

[15] 3,660,674

[45] May 2, 1972

[54] TRANSISTOR FLASHER WITH PREHEAT CIRCUIT FOR LAMP LOAD

[72] Inventor: John F. Bolinger, Michigan City, Ind.

[73] Assignee: Meridian Industries, Inc., Southfield, Mich.

[22] Filed: June 22, 1970

[21] Appl. No.: 48,322

[52] U.S. Cl. ............................307/202, 307/311, 315/112, 315/200 A, 315/209 R, 340/331, 340/366

[51] Int. Cl. .......................................H02h 7/20, H05b 37/02

[58] Field of Search ....................307/202, 311; 315/94, 102, 315/200 A, 209 R, 112–118; 340/74, 81, 366, 331

[56] References Cited

UNITED STATES PATENTS 3,263,119 7/1966 Scholl ......................................315/77

*Primary Examiner*—Stanley D. Miller, Jr.

*Attorney*—McGlynn & Reising and Milton & Ethington

[57] ABSTRACT

A flasher circuit has a power transistor controlling a circuit with a load therein; a multivibrator produces a timing signal applied to a second transistor for pulsing and turning "on" a related third control transistor which is effective in response thereto to apply a relatively small current flow to the load to preheat the load before application of the full current; additional semiconductor means, sensitive to a voltage signal or loss thereof in the load circuit due to the occurrence of a short, are effective for preventing the power transistor from being made conductive.

4 Claims, 1 Drawing Figure

PATENTED MAY 2 1972 3,660,674
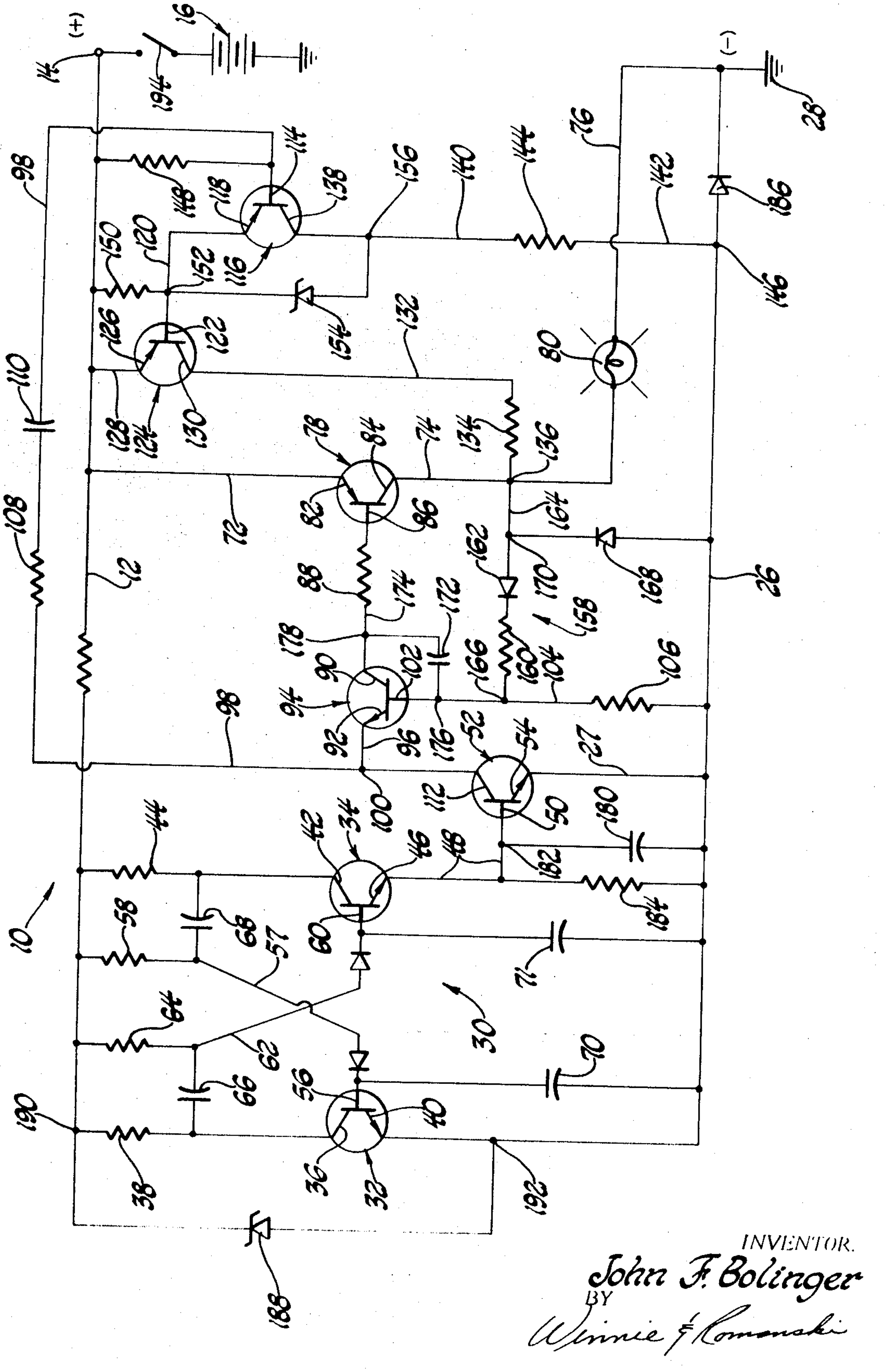
INVENTOR.
John F. Bolinger
BY
Winnie & Romanski
ATTORNEYS

TRANSISTOR FLASHER WITH PREHEAT CIRCUIT FOR LAMP LOAD

BACKGROUND OF THE INVENTION

Heretofore various circuits have been proposed for use as flasher circuits. However, such flasher circuits, especially when employing transistors for the load circuit, are susceptible to damage resulting from high current flow through the load circuit occasioned by the occurrence of a short in the load.

Various forms of short protection means have been proposed by the prior art; however, they have not been entirely successful. For example, some at the occurrence of a poor short, were incapable of shutting-down the power transistors while others were successful in partially shutting-down the power transistor but only to such values wherein the transistor was still susceptible to failure because of either the remaining relatively high current value or the internal heat generation resulting therefrom.

Further, it has been discovered that, especially in flasher circuits, the thermal stresses created in the power or load transistor can be substantially reduced if the load is at least to some degree preheated as by the application to the load of a relatively small preheating current prior to the switching "on" of the load or power transistor.

Accordingly, the invention as herein disclosed and described is directed to the solution of the above as well as other related problems.

SUMMARY OF THE INVENTION

According to the invention, a switching circuit comprises electrical load means, a load circuit containing said electrical load means, first load switching means in circuit with said load circuit, second means for cyclically producing a control signal for causing said first switching means to be at times rendered conductive, and additional means effective for applying a current flow of relatively low magnitude to said load means prior to said first load switching means being rendered conductive in order to thereby preheat said load means.

Various general and specific objects and advantages of the invention will become apparent where reference is made to the following detailed description considered in conjunction with the drawings.

DESCRIPTION OF THE DRAWINGS

The single drawing is a schematic wiring diagram of a flasher circuit employing the invention disclosed herein.

DESCRIPTION OF THE PREFERRED EMBODIMENTS

Referring now in greater detail, the single drawing illustrates a flasher circuit 10 comprised of a first conductor 12 having an end 14 suited for connection to a suitable source of electrical potential 16 and a second conductor 26 which leads to ground as at 28.

A signal producing portion 30 of the circuit 10 is illustrated as comprising oscillator means composed of transistors 32 and 34. Transistor 32 has its collector electrode 36 connected in series with a resistor 38 leading to conductor 12 while its emitter electrode 40 is connected to conductor 26. Transistor 34 similarly has its collector electrode 42 connected, in series with a resistor 44, to conductor 12 while its emitter electrode 46 is connected, via conductor 48, to the base electrode 50 of a third transistor 52 which, in turn, has its emitter electrode 54 connected to conductor 26 via conductor means 27.

Base electrode 56 of transistor 32 is electrically connected, via conductor 57, in series with one end of a resistor 58 which has its other end connected to conductor 12. Similarly, base electrode 60 of transistor 34 is electrically connected, via conductor 62, in series with one end of a resistor 64 which also has its other end connected to conductor 12.

A first capacitor 66 has one end or side connected to a point electrically between resistor 38 and collector electrode 36 and the other end or side connected to conductor 62. A second capacitor 68 similarly has one side connected to a point electrically between resistor 44 and collector electrode 42 of transistor 34 while its other side is connected to conductor 57. Additionally, capacitors 70 and 71 may be provided so as to have their respective one sides connected to conductors 57 and 62 while their respective other sides are connected to ground through conductor 26.

A load circuit comprised of conductors means 72, 74 and 76, load or power transistor 78 and electrical load means 80 is situated as to have conductor 72 electrically connected to conductor 12 while conductor 76 is connected to ground. Transistor 78 is arranged so as to have its emitter 82 and collector 84 in series with conductors 72 and 74 while its base electrode 86 is serially connected with a resistor 88 and the collector 90 and emitter 92 of a transistor 94 which, in turn, has its emitter 92 electrically connected, via conductor 96, to conductor means 98 as at 100. The base electrode 102 of transistor 94 is serially connected with conductor means 104 and resistance 106 leading to conductor 26.

Conductor means 98, including serially arranged resistance means 108 and capacitor 110, is connected at one end to collector 112 of transistor 52 and connected at the other end to the base electrode 114 of a transistor 116. The emitter 118 of transistor 116 is connected as by a conductor 120 to the base electrode 122 of a transistor 124 which has its emitter 126 connected to conductor 12, as by a conductor 128, and its collector 130 connected to a conductor 132 and resistor 134 leading to conductor 74 as at 136. The collector 138 of transistor 116 is electrically connected, via conductors 140, 142 and resistor 144 to conductor 26 as at 146.

A first resistor 148 is situated as to have one end connected to conductor 12 while its other end is connected to conductor means 98 at a point between base terminal 114 and capacitor 110. A second resistor 150 also is connected at one end to conductor 12 while its other end is connected to conductor 120 as at 152. Further, a zener diode 154 is arranged as to be in parallel with the emitter-collector of transistor 116 by being connected as at points 152 and 156 of conductors 120 and 140, respectively.

Conductor means 158, comprised of a resistor 160, diode 162 and conductor segment 164 is connected, across conductors 104 and 74, as at 166 and 136, respectively. A diode 168 is connected at its opposite ends to conductor 26 and conductor 164 as at a point 170.

Transistor 94 has a condenser 172 arranged so as to be in parallel with the base 102 and collector 90 thereof as by having opposite sides of the condenser 172 connected to conductors 104 and 174 as at points 176 and 178. Similarly, transistor 52 has a condenser 180 arranged in parallel with the base 50 and emitter 54 thereof by having opposite sides of the condenser 180 respectively connected to conductor 26 and conductor 48 as at 182. A resistor 184 is also arranged in parallel with condenser 180. A diode 186 is preferably provided in conductor 26, as between point 146 and ground 28, while, preferably, a zener diode 188 (or other suitable means having a zener characteristic) is provided so as to be connected at its opposite ends to conductor 12, as at 190, and conductor 26, as at 192. Further, diodes 194 and 196 respectively connected in the base circuits of transistors 32 and 34, although not essential to the practice of the invention, are nevertheless preferred in order to serve as voltage limiters for such transistors. In this connection, resistor 198, in series with conductor 12, may also be employed as a means of reducing the line voltage to the oscillator or multivibrator section 30. Capacitors 70, 71 and 180 are primarily provided as a means of noise suppression in order to prevent transistors 32, 34 and 52 from going into conduction as a result of stray signals.

OPERATION OF THE INVENTION

In view of the above, it can be seen that each of transistors 32, 34,52 and 94 are of the N-P-N type while transistors 78, 124 and 116 are of the P-N-P type. Accordingly, during normal conduction, in the N-P-N type, the emitter will be negative with respect to both the collector and base while the collector is positive with respect to both the emitter and base. In the P-N-P type, normal operation or conduction is achieved when the emitter is positive with respect to both the collector and base while the collector is negative with respect to both the emitter and base.

Further, transistors 32 and 34 comprise a multi-vibrator the operation of which is generally as follows. Assuming that a related control switch 194 is closed, let it be assumed that transistor 32 has just switched "on," creating current flow through the emitter-collector circuit 40, 36 and that transistor 34 has switched "off" or to its non-conducting state. It can be seen that at this particular instant capacitor 66 was fully charged and that the side thereof connected to resistor 64 was negative with respect to the other side of capacitor 66 which is connected to resistor 38 and collector 36. The circuit through emitter-collector circuit 36, 40 is completed to ground 28 as by conductor 26. At this time capacitor 68 will be discharged.

Capacitor 66 now starts charging toward the opposite polarity through resistor 64 by virtue of being essentially connected to conductor 26 when transistor 32 is conducting and the emitter-collector circuit thereof is completed. It can also be seen that because of the charge existing on capacitor 66, at the instant that transistor 32 went into conduction, and its connection to base electrode 60 of transistor 34 via conductor 62, the emitter-base electrodes of transistor 34 are reverse biased (the base being negative with respect to emitter 46) thereby keeping transistor 34 in an off or non-conducting state. At this same time, capacitor 68 will start to charge essentially through the emitter-base circuit of transistor 32 and resistor 44. This charging current holds transistor 32 conductive or "hard-on;" further, even when charging of capacitor 68 is completed, the transistor 32 will remain conductive by virtue of the base current provided by resistor 58.

As the potential across capacitor 66, holding transistor 34 off, is reduced, a condition is finally attained where the capacitor 66 voltage can no longer maintain transistor 34 in the non-conducting state. As transistor 34 starts to become conductive, by virtue of a biasing current through resistor 64, the collector to emitter voltage thereof drops and the charged capacitor 68 now starts to discharge through the emitter-base circuit of transistor 32, resulting in a reverse bias driving transistor 32 into non-conduction.

When transistor 32 is thusly driven into non-conduction, the voltage across its emitter 40 and collector 36 increases causing capacitor 66 to again start charging through the emitter-base circuit of conductive transistor 34.

In this new state (transistor 34 being conductive) capacitor 68 starts to charge toward the opposite polarity through resistor 58 by virtue of being connected to conductor 26 through the conducting transistor 34. When transistor 34 was switched into conduction, capacitor 68 was negatively charged on its side connected to conductor 57, with respect to its side connected between resistor 44 and collector 42. Further, the polarity on capacitor 68, at the time of switching transistor 34 "on," produces a reverse bias on transistor 32.

During the time that transistor 34 is conducting capacitor 66 is being charged so that its end or side connected to resistor 64 and conductor 62 will become negative with respect to its side connected between resistor 38 and collector 36. Such charging of the capacitor 66 is the consequence of the base current flow through transistor 34 which also serves to hold the transistor 34 in its "on" or conductive state. It should be apparent that transistor 32 is also maintained conductive for some period after capacitor 66 has been fully charged because of the base bias provided by resistor 64.

However, as capacitor 68 continues to discharge and the voltage thereacross approaches zero, the voltage holding transistor 32 in a non-conducting state decreases and transistor 32 starts to again become conductive. This initiates the regenerative cycle which results in the rapid "turn on" of transistor 32 and a "turn off" of transistor 34 as well as the subsequent rapid "turn off" of transistor 32 and "turn on" of transistor 34. In this arrangement resistors 38 and 44 serve to respectively limit the collector currents of transistors 32 and 34 while resistor 64 and capacitor 66 combine to determine the "off" or non-conducting time of transistor 34 and, similarly, resistor 58 and capacitor 68 combine to determine the off or non-conducting time of transistor 32.

Generally, it can be seen that transistor 34, when "on" or in its conducting state, forwardly biases transistor 52 into conduction and that when transistor 94 is turned "on" transistor 94 also serves to drive the base 86 of transistor 78. Further, as will subsequently become more apparent, transistor 52 also provides a momentary current flow through the bases of both transistors 124 and 116. Such a momentary current flows during the time that coupling capacitor 110 is charging. Even though it has been determined that capacitor 110 can subsequently discharge through its own internal resistance, if desired, an additional resistor of relatively high value may be placed in parallel with capacitor 110.

Referring now in greater detail, it can be seen that when transistor 52 is turned "on" there is a momentary current flow through conductor means 98, including resistor 108 and capacitor 110, and base 114 of transistor 116 thereby causing both transistor 116 and transistor 124, coupled thereto as by conductor 120, to become conductive. When this happens, a circuit is completed from conductor 128, emitter 126, collector 130, conductor 132, resistor 134 to point 136 and then through conductor 74, lamp load 80 and conductor 76 to ground 28. The current flow therethrough, limited by resistor 134, is of a relatively high value but of a magnitude less than the rated lamp current of the lamp load 80. The purpose of this current is to preheat the filaments of thebulbs in the lamp load 80 thereby significantly increasing the resistance thereof.

The preheat current thusly flowing through the lamp load 80, develops a voltage, as at point 136, which is of the correct polarity to cause current flow through diode 162 and resistor 160 so that point 166 and base electrode 102 become sufficiently positive with respect to emitter 92 so as to cause transistor 94 to become conductive thereby completing a circuit through conductor 96, emitter 92 and collector 90 of transistor 94 as well as resistor 88 and base 86 and emitter 82 of transistor 78. This, in turn, causes transistor 78 to become conductive completing a circuit from conductor 12 through conductor 72, emitter-collector of transistor 78, conductor 74, lamp load 80 and conductor 76 to ground 28. The current flow thusly established through the emitter-collector of transistor 78 brings the electrical load 80 completely on.

Consequently, it can be seen that any initial current surge through transistor 78, upon transistor 78 being made conductive, is greatly reduced because the filaments within the lamp load 80 have been preheated by the reduced current flow previously provided through transistor 124. This, of course, only prevents damage to the power or load transistor 78 but also assures a longer useful life for the lamp load because of the reduction of the magnitude of thermal shock experienced by the filaments.

The pulse time, determined by capacitor 110 and resistor 108 is, of course, sufficiently long as to permit transistor 78 to become conductive, as above described, prior to termination of the pulse. However, when the initial pulse subsides, due to capacitor 110 becoming charged, the bias on transistor 116 ceases to exist causing transistor 116 to become turned "off" which, in turn, causes transistor 124 to also become turned "off."

However, even with transistors 116 and 124 being turned "off," transistor 94 remains in its "on" or conductive state because of transistor 78 remaining conductive and thereby continuing to provide the necessary forwardly biasing voltage (as previously explained) keeping transistor 94 conductive. Of course, when transistor 34 is subsequently cyclically turned "off," transistors 52, 94 and 78 are also turned "off" thereby placing the circuitry in condition for another repeat cycle.

At this point it might be best to point out that resistors 184, 150 and 148 are principally employed to reduce leakage currents and thereby respectively prevent transistors 52, 124 and 116 from partially conducting when they are supposed to be fully off. Resistor 144 serves to limit the current through transistor 116 while resistor 160 limits the emitter-base current of transistor 94.

From the preceding it should be apparent that in the normal sequence of events, transistor 94 is first made conductive which, in turn, causes the power transistor 78 to be turned "on," and that the turning "on" of transistor 94 requires the creation of a positive voltage of sufficient magnitude as at point 136 when transistor 124 is made conductive.

If a short should occur in the load 80 or its circuit, such a short will characteristically exhibit itself much like a closed switch with either no or very little resistance. Therefore, assuming that such a short in the load does exist, it can be seen that when transistor 124 is made conductive (through the application of the initial pulse to transistor 116, as previously described), point 136 will be at or nearly ground potential thereby developing either no voltage or an insufficient voltage to turn on transistor 94 and, of course, without transistor 94 being turned "on" load or power transistor 78 cannot be made conductive. Therefore, under such conditions, power transistor 78 will be protected from experiencing excessive power dissipation due to the short.

Resistor 106 is employed to assure that the emitter-base diode of transistor 94 will not conduct during short circuit conditions in the load circuit. Further, in the event of an occurrence of a complete or perfect short in the load circuit, resistor 106 actually functions to reverse or back bias the emitter-base diode of transistor 94 due to the voltage drop across transistor 52. However, in the event of an occurrence of a relatively poor or incomplete short, resistors 106 and 160 function to divide the voltage across the load 80 and thereby help prevent transistor 94 from becoming conductive. Similarly, both diodes 162 and 186 also provide voltage drops thereacross which further help to keep transistor 94 turned "off" in the event of a poor short in the load circuit. Additionally, diode 186 serves to prevent any possible damage which might otherwise occur from any possible voltage of the wrong polarity applied to the circuitry either accidentally or by negative voltage spikes. In situations where diode 186 may not be employed, it is preferred that diode 168 be employed in order to accommodate any possible voltage spikes appearing as at point 136.

In view of the preceding, it should be apparent that functional equivalents could be substituted for the various sections of the circuitry as well as components or elements contained therein. For example, it is conceivable that timed signal producing means other than the oscillator or multivibrator, specifically disclosed, could be employed without in any way effecting the operation of the remaining circuitry. Also, as should be apparent, the circuitry disclosed could be practiced employing P-N-P transistors for those that are shown as N-P-N and vice versa where appropriate polarity changes are made as is well known in the art.

Although only one preferred embodiment of the invention has been disclosed and described, it is apparent that other embodiments and modifications of the invention are possible within the scope of the appended claims.

I claim:

1. In a flasher circuit of the type adapted to intermittently energize a load device from a voltage source, an oscillator for producing intermittent control signal impulses, a power switching transistor adapted to be switched between on and off conditions in response to said control signal impulses to connect and disconnect the load device and the voltage source, the improvement comprising control means connected between said oscillator and said power switching transistor, said control means including a preheating transistor having its output connected between said voltage source and said load device, a time constant circuit connected between the oscillator and the input of the preheating transistor to turn on the preheating transistor during the initial portion only of each of said signal impulses whereby a momentary preheating current may flow through said load device, and voltage responsive means connected across said load device and in circuit with the input of the power switching transistor for switching it to its on condition when the voltage across the load device reaches a predetermined value and to hold it in said on condition for the duration of the control signal impulse.

2. The invention as defined in claim 1 wherein said control means also includes amplifying means having an input operatively connected with the oscillator and an output operatively connected with the power switching transistor for switching it to one of said conditions in response to said control signal impulses and wherein the time constant circuit is connected between said amplifying means and the input of the preheating transistor.

3. The invention as defined in claim 2 wherein said voltage responsive means includes a control transistor having its input connected across the load device in circuit with the output of said amplifying means and having its output connected in circuit with the input of said power switching transistor whereby the power switching transistor is held in said on condition for the duration of the control signal impulse.

4. The invention as defined in claim 3 wherein said voltage responsive circuit includes a diode connected in series with the input of said control transistor to establish the predetermined value of voltage.

* * * * *